(12) United States Patent
Wilson

(10) Patent No.: US 8,112,550 B2
(45) Date of Patent: Feb. 7, 2012

(54) SYSTEM AND METHOD FOR PRESERVING CONSUMER CHOICE

(75) Inventor: Joseph Wilson, Fairfax, VA (US)

(73) Assignee: Tacoda LLC, New York, NY (US)

( * ) Notice: Subject to any disclaimer, the term of this patent is extended or adjusted under 35 U.S.C. 154(b) by 856 days.

(21) Appl. No.: 11/580,023

(22) Filed: Oct. 13, 2006

(65) Prior Publication Data

US 2008/0126567 A1    May 29, 2008

Related U.S. Application Data

(60) Provisional application No. 60/845,538, filed on Sep. 19, 2006.

(51) Int. Cl.
G06F 15/16 (2006.01)
G06F 1/04 (2006.01)

(52) U.S. Cl. .......................................... 709/248; 713/375

(58) Field of Classification Search .................. 709/248; 713/182, 375
See application file for complete search history.

(56) References Cited

U.S. PATENT DOCUMENTS

| | | | | |
|---|---|---|---|---|
| 6,327,609 | B1 * | 12/2001 | Ludewig et al. | 709/203 |
| 6,691,127 | B1 * | 2/2004 | Bauer et al. | 707/702 |
| 6,708,221 | B1 * | 3/2004 | Mendez et al. | 709/248 |
| 6,959,420 | B1 * | 10/2005 | Mitchell et al. | 715/745 |
| 6,976,093 | B2 * | 12/2005 | Lara et al. | 709/248 |
| 7,024,451 | B2 * | 4/2006 | Jorgenson | 709/248 |
| 2001/0032317 | A1 * | 10/2001 | Crockett | 713/190 |
| 2001/0044834 | A1 * | 11/2001 | Bradshaw et al. | 709/217 |
| 2003/0131045 | A1 * | 7/2003 | McGee et al. | 709/201 |
| 2004/0181598 | A1 * | 9/2004 | Paya et al. | 709/227 |
| 2005/0066037 | A1 * | 3/2005 | Song et al. | 709/227 |
| 2005/0203972 | A1 | 9/2005 | Cochran | |
| 2005/0235155 | A1 | 10/2005 | Lopatin et al. | |
| 2005/0268107 | A1 | 12/2005 | Harris et al. | |
| 2005/0278416 | A1 | 12/2005 | Kay et al. | |
| 2005/0278458 | A1 * | 12/2005 | Berger et al. | 709/248 |
| 2007/0250618 | A1 * | 10/2007 | Hammond | 709/224 |

* cited by examiner

Primary Examiner — Melanie Jagannathan
Assistant Examiner — Kai Chang
(74) Attorney, Agent, or Firm — David R. Yohannan; Kelley Drye & Warren LLP

(57) ABSTRACT

Methods and systems for preserving user attribute data by way of managing and synchronizing redundant storage locations.

9 Claims, 3 Drawing Sheets

SYSTEM AND METHOD FOR PRESERVING CONSUMER CHOICE

CROSS-REFERENCE TO RELATED APPLICATIONS

This application claims benefit from U.S. Provisional Patent Application Ser. No. 60/845,538, filed on Sep. 19, 2006.

BACKGROUND OF THE INVENTION

All references cited in this specification, and their references, are incorporated by reference herein where appropriate for teachings of additional or alternative details, features, and/or technical background.

1. Field of the Invention

The present invention generally relates to the preservation of user data, such as (without limitation) web identity, personal information, and opt-out choice, by the use of a plurality of storage locations.

2. Description of the Related Art

Internet use is becoming more predominate every day. As the number of users, and web servers providing them information increases, the desire to directly market, track and monitor these users likewise rises. To accomplish this targeting, web-involved companies survey activities such as a web user's preferences, and web page visits—behavior with respect to the web. Tracking user behavior can have clear benefits for the internet savvy company. One such benefit is accurate targeting of their products to consumers, resulting in more efficient use of advertising dollars.

Historically tracking web users was accomplished via HTTP cookies. Cookies are a widely used Internet browser technology that allow for the storage of user attribute data, such as a zip code, age, or gender, within the browser itself. Such information can be useful at a later time during the reloading of a web page to provide a more personalized page to the consumer, such as showing their local content or assisting with preloading a form.

To protect the user to some degree, browsers have implemented some safeguards into the use of HTTP cookies. Ensuring privacy and security of the data being stored, browsers may only allow a server to set and read cookies within the same domain as the server. However, references to other sites may be embedded in a page served by a given site that also allows those other sites to set cookies, in the so-called third party context. Such third party cookies are used extensively in the online advertising and analytics industries to identify behavior associated with a pseudonymous user identification code, allowing these companies to associate multiple behaviors across a myriad of sites with a single pseudonymous identity.

It has also become common practice for a site that engages in behavioral tracking to offer consumers the opportunity to not participate, or "opt-out" of the tracking. Since a cookie is the built-in browser mechanism for the storage of consumer data within the browser itself, companies have chosen to store the opt-out information of a consumer within a cookie as well.

Recent years have seen development of "privacy management" tools that allow the user to periodically clear specific cookies, based upon the tool's recommendations. Unfortunately, these tools often are indiscriminate when choosing which cookies to delete and which to preserve. Consequently, the information regarding which users chose to opt-out of a particular site's services is lost when such a tool, installed by the user, clears these consumer opt-out choice cookies. Once the cookie containing the opt-out information is cleared, no record of the consumer's opt-out choice can be preserved. This can lead to the consumer's behavior, once again being tracked as it was prior to the opt-out choice being made.

Further, these tools are often bundled together with other tools and presented as a security package or privacy toolkit. Consumers may be unaware these tools are clearing their cookie information or otherwise modifying their values. The user might, however, wish to maintain their opt-out choice values. There is need, therefore, for an improved method for storing user attribute data in other than cookies.

U.S. Patent Publication No. 2005/0235155 describes a method and apparatus for identifying and storing information regarding individual users on a network without using cookies. The apparatus makes use of a read/write temporary file which is cached in the Internet cache of the user's computer, yet is not recognized by the user's browser as a cookie. An identification code may be made available in a user's computer, either as a file stored in the browser cache or in hardware in the user's computer. Such publication does not suggest the use of storing such opt-out cookies in such cache, nor does it suggest, as presently disclosed, the storage of data on multiple storage sites to allow for redundancy checks.

SUMMARY OF THE INVENTION

There is disclosed herein in embodiments, a computer-implemented method for preserving computer user attribute data for use in a computer network including a plurality of servers, and a plurality of clients having a network browser, the method comprising the steps of: storing the user attribute data in two or more data locations associated with a client; receiving, at a client from a server, instruction code configured to cause the user attribute data to be preserved; determining synchronization of the user attribute data stored in the two or more data locations responsive to receipt of the instruction code; and synchronizing the user attribute data stored in the two or more data locations to preserve the user attribute data if the stored user attribute data is not already sufficiently synchronized to preserve the user attribute data. The stored user attribute data may in one embodiment relate to opt-out information, preference information of the user, and other types of information which a user does not desire to be cleared by privacy tools.

In yet another embodiment, there is disclosed a computer network system having a plurality of servers and a plurality of clients, the system further comprising: means for causing storage of user attribute data at two or more data locations associated with the client at a first point in time; means for determining the synchroneity of the user attribute data at each of the two or more data locations associated with the client at a second point in time; and means for synchronizing the user attribute data at each of the two or more data locations of the client if the user attribute data at each of the two or more data locations at the second point in time is found not to be synchronous.

Further in an embodiment there is disclosed a computer program product in a client-server network comprising a computer useable medium readable by a digital processing apparatus and tangibly embodying a program of instructions comprising computer readable program executable by the digital processing apparatus to perform method steps comprising: (a) generating a first transmission containing instruction code operatively configured to cause a client to provide a return transmission related to the user attribute data stored at two or more data locations associated with the client; and (b) generating a second transmission if the return transmission from the client does not indicate synchroneity between the user attribute data stored at the two or more data locations associated with the client, the second transmission comprising instruction code operatively configured to cause the user attribute data to be synchronized at each of the two or more data locations.

BRIEF DESCRIPTIONS OF DRAWINGS

Embodiments of the invention are illustrated in the accompanying drawings in which.

DETAILED DESCRIPTION OF THE INVENTION

Figure 1:
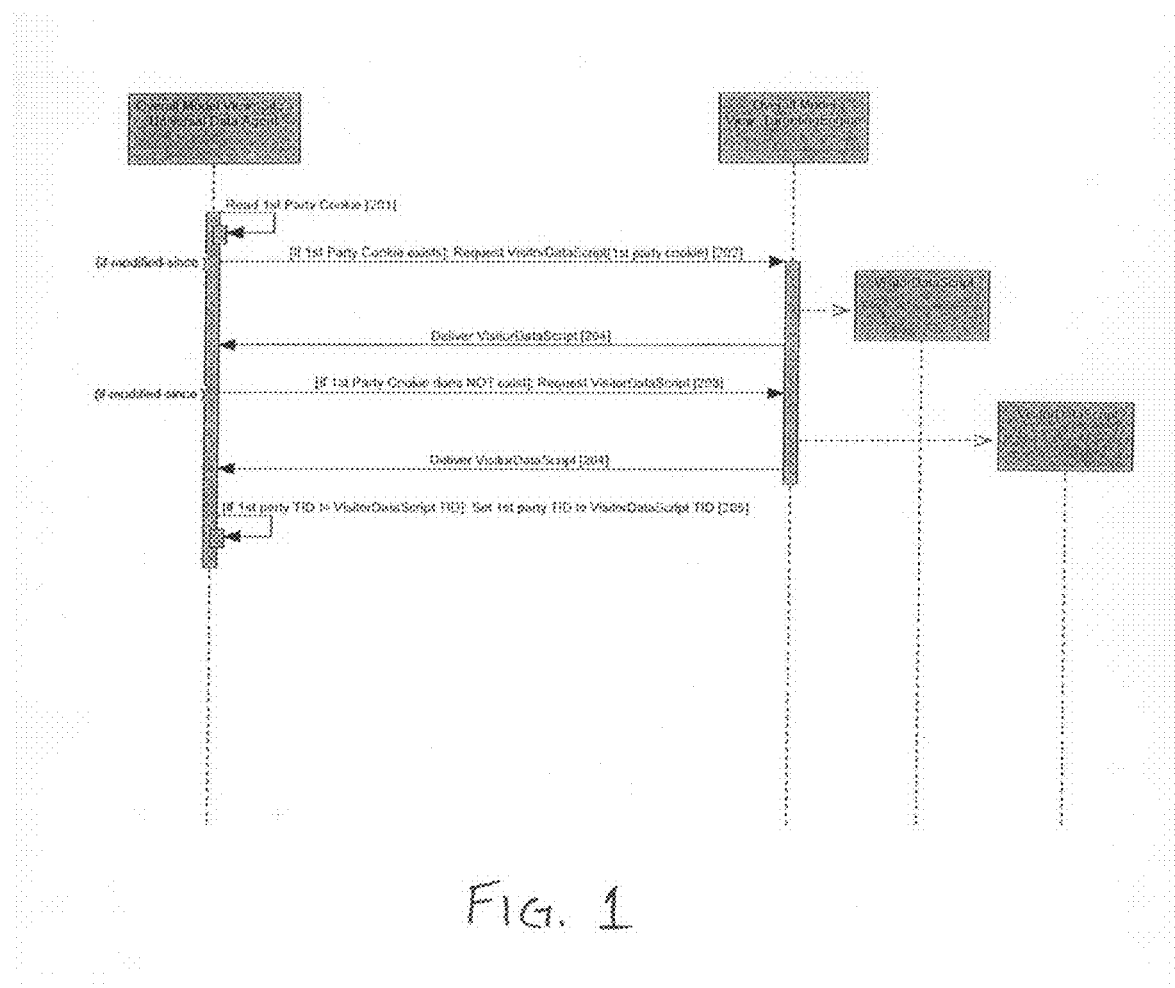
FIG. 1 is a browser interaction diagram illustrating information flow between a browser, a publisher and a service provider.

There is disclosed herein a method and system to preserve the identity and user attribute data, such as interests, preferences, characteristics or opt-out selection, of a user by means of synchronizing two or more redundant storage locations, wherein loss or damage of user attribute data may be restored from redundant storage based on an algorithm, thereby preserving the data integrity. By synchronization of data in two or more locations it is meant: to alter and conform the stored user attribute data with respect to each location, such that the data is at least 80% identical in information read with respect to the two locations, or at least 90% identical, or at least 99% identical. The management of such storage locations can occur in spite of manual or automatic clearing of HTTP cookies by a user or a computer software tool, such as those providing security and/or privacy functions related to Internet browsing.

Storage locations for redundant storage that may be employed include, without limitation, browser cookies, browser cache, the Flash Shared Objects store, storage allocated to Java applets or other storage medium available to the browser, such as, for example random-access-memory. The management of such storage locations can occur in spite of manual or automatic clearing of one or more storage locations by a user or a computer software tool, such as (without limitation) those providing security and/or privacy functions related to Internet browsing, so long as a single storage location remains. Such alternative sources may be algorithmically maintained, for example, wherein the authoritative storage locations used to synchronize user attribute data may be based on criteria, such as, for example, persistency of cookies, and/or Internet cache vitality. Death or absence of a cookie, for example, may trigger resynchronization of the user attribute data against the most recently stored data, wherein user attribute data within the storage location may be compared to each other, such that a determination may be made as to which data location if any contains up-to-date user attribute data, and therefore, may be considered authoritative. Likewise, a synchronization of the storage locations might be triggered by out-of-date or stale cache, as indicated by an "If-Modified-Since", or "Last-Modified" request-header field.

One embodiment of the present invention comprises a system and method for preserving the identity, personal information, and/or opt-out choice of a user. One generally accepted opt-out choice is a method of requiring a targeted user to explicitly respond to a solicitation in order to keep from receiving some service or "widget," usually associated with marketing. In this embodiment, the identity and opt-out choice may be simply pieces of information to be stored and retrieved from the browser or other storage locations available to the browser or browser plug-ins at the appropriate time. Further to this embodiment, if one storage location looses user attribute data, such as an opt-out choice, an alternative storage location may provide a source of user attribute data to re-synchronize the lost data; thereby maintaining the integrity of each storage location and user attribute data therein. The storage and retrieval of arbitrary data follows from the particular embodiment.

The present invention contemplates managing the synchronization of storage locations via instruction code, such as for example JavaScript; as well as a variety of client side scripting or programming languages, including, but not limited to, Java applets, Flash ActionScript, a customer browser plug-in or an installed piece of code on the user's computer.

FIG. 1 illustrates a process state diagram for synchronizing an Internet browser request with authoritative data which may find use in one embodiment of the invention. A user employing browser 210 may issue request 201 for web page 202, from website "Publisher" 215, for example www.publisher-.com. Upon receiving browser request 201, publisher 215 may return requested page 202, and may within such a page embed a JavaScript code to call third party service 220, such as an advertising provider server or network. The browser may issue a third party request 203 to the third party service provider server 220, receiving returned JavaScript code 204 to effect an authoritative synchronization of the storage locations. Returned JavaScript code 204 may read the browser information, such as the first party cookie and may optionally pass one or more value 205 back to the advertising provider server 220, using standard web browser and web server communications. If the browser data does not exist, a call 206 may still be made to the advertising provider's server 220 without the browser data. The web server may receive the browser data and may also read any cookies passed as part of the request. The cookies, in compliance with privacy and security rules of browsers, may have been previously set by the advertising provider and may only be accessible by the advertising provider when such a request of its server is made.

The request made of the advertising provider's server may be, for example, of two different types: a normal HTTP GET request (wherein whatever information, in the form of an entity, is identified by the Request-URL); or a request from the browser to verify that the data received from a previous call to the same server by the same browser is still valid. The latter call may occur when a browser has cached a previous request to the server, known as an "If-Modified-Since" call. For the browser to consider the cached version, the request must use an identical URL web address. In addition to the browser data and cookies, an "If-Modified-Since" call may also pass the "Last-Modified" date of the document stored in the browser's cache.

Figure 2:
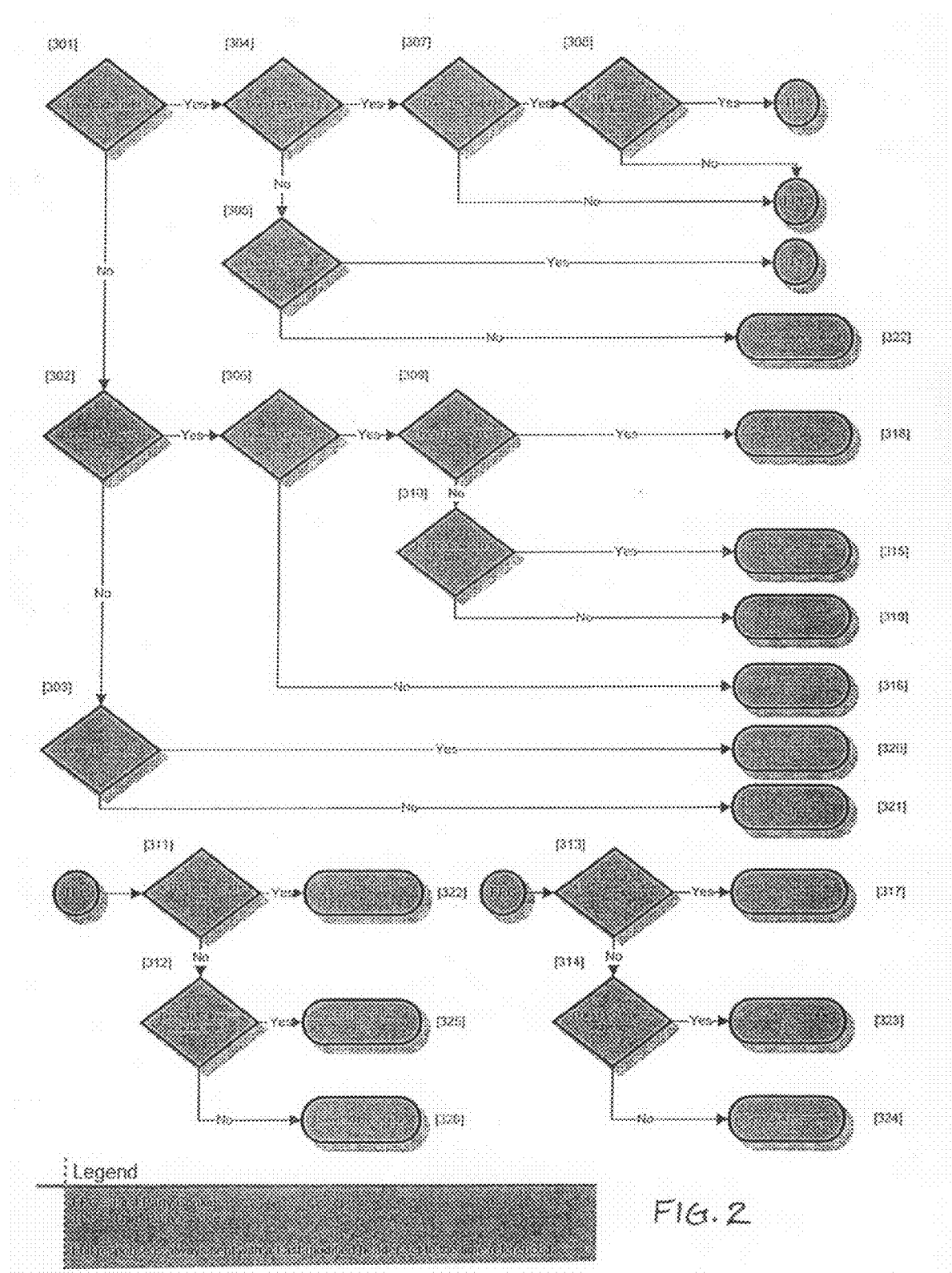
FIG. 2 is a flowchart illustrating an algorithm for determining an authoritative storage location.

In this embodiment, the advertising provider's server may now algorithmically determine, as exemplified in FIG. 2, what steps are necessary in order to synchronize the user attribute data in each of the storage locations. In this embodiment, the browser data and cookies may contain a recency date that describes how recently the user attribute data was updated. The server might, in addition, use the "Last-Modified" date of the "If-Modified-Since" request, as directed above, as a recency date for the cache storage. The server may now choose to synchronize the user attribute data in all storage locations against the most recently stored authoritative data.

Continuing with FIG. 1, once an authoritative storage location has been selected 207, the user attribute data stored in that location may be synchronized to the other storage locations 206, placing each in an updated state. To complete the user's request, the browser may update any browser data according to the data received back from the service provider's servers 209.

In the example set forth, the browser data is limited to cookies set in the domain of the browser, cookies set in the domain of the service provider, and data stored in the cache. However, it should be clear to one skilled in the art that there is no practical difference between cookies, Flash Shares Object Stores, Java Applet Storage and other browser storage locations.

FIG. 2 illustrates a flowchart representation of one embodiment of a decision tree for determining the authoritative storage location. In FIG. 2, the server may determine whether the cache, first party cookie, and third party cookie are available 301-307, such as might be determined, for example, by a useful recency date. If such cache does exist, the decision tree may progress to determine which user attribute data on the user's computer is the most recent 308-314 by comparing the recency dates of each storage location available and choosing as authoritative the one with the most recent date.

If the authoritative storage location is the first party cookie, the server may send back a response containing the browser data and a request to update the cache and third party cookie storage location 315-317. Alternatively, if the authoritative storage location is the third party cookie, the server may return a response containing the data in the third party cookie and a request to update the cache and first party cookie storage locations 318-322. Similarly, if the cache is determined to be the authoritative storage location, a response may be sent back informing the browser that the cache is still correct, known as a "HTTP 304 response", indicating that no update to the cache is required. In addition to the HTTP 304 response, a request may be sent from the server to update the first party and third party cookies 322-326.

Figure 3:
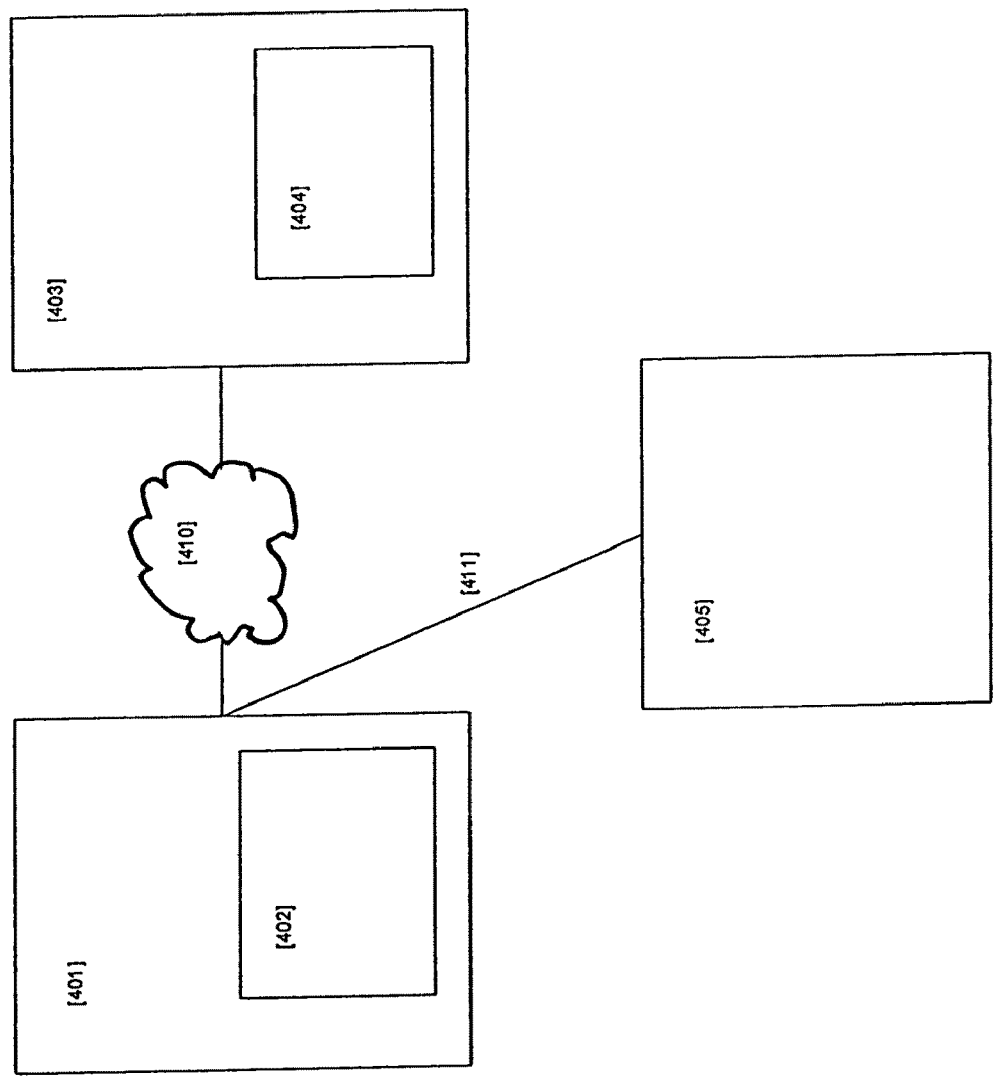
FIG. 3 is a system diagram depicting a user interacting over a widely distributed public network, such as the Internet, with other resources.

FIG. 3 is a block diagram depicting one embodiment of a system for preserving user attribute data. As illustrated in FIG. 3, computer browser 402 operated by user 401 may issue request 415, 415' via Internet 410 to access a information 403, such as a website, containing module 404 that may facilitate the preservation of the user attribute data. Module 404 may instruct the user's browser to communicate over channel 411, 411' with service provider 405 that may, for example, be providing advertising in cooperation with the website of origin. Service provider 405 might send back instruction code (by which it is meant to include code executable by the client, and code self-executing in the client such as within the browser domain, e.g., Java Applets) to the user's web browser, over the same communication channel 411, 411' for the purpose of ensuring the preservation user attribute data.

The embodiments described above may be employed to preserve the identity and opt-out choice of the user even when the cookie is cleared either manually or through the use of "security and privacy" tools. Again, this process can be easily extended to any user attribute data (such as interests, preferences, characteristics, etc).

Multiple redundant storage locations may be used to preserve the integrity of the data stored therein. In this way, if one storage location is damaged or cleared, an alternative storage location can be used to resynchronize the data into the affected storage. It is necessary to have more than one storage location for the redundancy to be effective.

STATEMENT REGARDING PREFERRED EMBODIMENTS

While the invention has been described with respect to the foregoing, those skilled in the art will readily appreciate that various changes and/or modifications can be made to the invention without departing from the spirit or scope of the invention as defined by the appended claims.

What is claimed is:

1. A computer-implemented method for preserving computer user attribute data, said method for use in a computer network including a plurality of servers, and a plurality of clients having a network browser, said method comprising the steps of:
   storing the user attribute data in two or more data locations, the user attribute data being associated with a client;
   receiving, at a client from a server, instruction code configured to cause the user attribute data to be preserved;
   determining synchronization of the user attribute data stored in said two or more data locations responsive to receipt of the instruction code;
   synchronizing the user attribute data stored in said two or more data locations to preserve the user attribute data if said stored user attribute data is not already synchronized to preserve the user attribute data;
   determining a lack of synchronization of the user attribute data stored in a first of said two or more data locations with the user attribute data stored in a second of said two or more data locations; and
   responsive to determining the lack of synchronization of the user attribute data stored in the first and second of said two or more data locations, restoring the user attribute data in the first of said two or more data locations so that the user attribute data in the first and second of said two or more data locations is synchronized, wherein the stored user attribute data includes information pertaining to client-side opt out choices with respect to communications with a network site.

2. The computer-implemented method of claim 1, wherein the user attribute data includes information pertaining to the identity of the client.

3. The computer-implemented method of claim 1, wherein the user attribute data is stored as a browser cookie.

4. The computer-implemented method of claim 1, wherein the user attribute data is stored as a Java Applet.

5. The computer-implemented method of claim 1, wherein the user attribute data is stored as a Flash Shared Objects.

6. The computer-implemented method of claim 1, wherein the user attribute data is stored in browser cache.

7. The computer-implemented method of claim 1, wherein the user attribute data is stored in random-access-memory.

8. The computer-implemented method of claim 1, further comprising the step of:
   updating stored user attribute data in said two or more data locations associated with said client if said user attribute data is outdated.

9. The computer-implemented method of claim 1, wherein said determination of synchronization further comprises the steps of:
   comparing the user attribute data stored in said two or more data locations to each other; and
   selecting one of said two or more data locations to be the first of said two or more data locations based on recency data.

* * * * *